United States Patent
Jacobsen (10) Patent No.: US 7,260,361 B2
(45) Date of Patent: Aug. 21, 2007

(54) LOCATING INTERFERING DEVICES IN WIRELESS NETWORKS USING CHANNEL ADAPTATION METRICS

(75) Inventor: Eric A. Jacobsen, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 10/748,867

(22) Filed: Dec. 29, 2003

(65) Prior Publication Data

US 2005/0143011 A1    Jun. 30, 2005

(51) Int. Cl.
*H04B 1/00* (2006.01)
*H04B 15/00* (2006.01)

(52) U.S. Cl. .................. 455/63.1; 455/42; 455/67.11; 455/114.2; 370/210; 370/332; 370/298; 375/261; 375/268; 375/271

(58) Field of Classification Search ............ 455/67.11, 455/67.13, 67.14, 67.16, 70, 67.15, 42, 63.1, 455/114.2; 370/338, 210, 332, 298; 375/261, 375/268, 271
See application file for complete search history.

(56) References Cited

U.S. PATENT DOCUMENTS

2002/0015393 A1* 2/2002 Pan et al. ................ 370/335
2003/0045307 A1* 3/2003 Arviv et al. ................ 455/464
2003/0097623 A1* 5/2003 Razavilar et al. ........... 714/704
2003/0220109 A1* 11/2003 Jami et al. .................. 455/437
2004/0004998 A1* 1/2004 Fitton et al. ................ 375/219
2004/0022176 A1* 2/2004 Hashimoto et al. ......... 370/204
2004/0032850 A1* 2/2004 Marinier et al. ............ 370/345

FOREIGN PATENT DOCUMENTS

| EP | 1298949 A1 | 4/2003 |
| WO | WO 02/09312 A | 1/2002 |
| WO | WO 02/13405 A | 2/2002 |

\* cited by examiner

*Primary Examiner*—Matthew Anderson
*Assistant Examiner*—Tuan Pham
(74) *Attorney, Agent, or Firm*—Stuart A. Whittington (57) ABSTRACT

A method, apparatus and system relate to detecting an interfering device in a wireless network such as a wireless local area network (WLAN). In wireless networks using orthogonal frequency division multiplexing (OFDM) and adaptive bit loading (ABL), adaptive modulation information should be somewhat symmetric in uplink and downlink directions. By comparing modulation adaptations in the uplink and downlink directions of a communication channel between at least two terminals, identified differences can indicate the presence of a potential interferer in the wireless network. A location of the potential interferer can be estimated if a location of one or more network terminals experiencing interference is known or can be determined. An exemplary implementation for a device of the invention may be as an Access Point (AP) in the WLAN.

30 Claims, 5 Drawing Sheets

Frequency Domain Modulation Adaptations

LOCATING INTERFERING DEVICES IN WIRELESS NETWORKS USING CHANNEL ADAPTATION METRICS

BACKGROUND OF THE INVENTION

The embodiments of the present invention relate to methods and systems for detecting interfering devices in a wireless network. More particularly, but not exclusively, the embodiments relate to detecting sources of radio interference in a wireless local area network (WLAN).

Wireless communication systems pose unique problems not typically associated with wired systems. For example, many devices in wireless networks (e.g., WLAN) broadcast and/or receive signals using omnidirectional antennas. Omnidirectional signal transmissions are used to provide simultaneous coverage between multiple user stations without concentrating transmitted power to any one particular user. This may often result in unequal reception of transmitted signal energy between users due to distance, obstacles, signal scattering and/or signal reflections. Accordingly, components of a signal arriving at a receiver in a wireless network may often be spread out over a longer period of time than is desirable.

Additionally, wireless networks, for example those utilizing unlicensed frequency spectrums such as WLAN or Bluetooth, may experience interference from other non-network wireless devices using similar frequency bands within range of the wireless network. Non-network wireless devices may attempt to use the same channel resources used in the wireless network and thus create interference within the wireless network. It is therefore desirable to be able to detect and/or locate the interfering device(s) so they may be turned off, moved to another non-interfering location, and/or changed to utilize a different frequency spectrum.

BRIEF DESCRIPTION OF THE DRAWING

Aspects, features and advantages of the present invention will become apparent from the following description of the invention in reference to the appended drawing in which like numerals denote like elements and in which.

DETAILED DESCRIPTION OF THE INVENTION.

While the following detailed description may describe example embodiments of the present invention in relation to WLAN utilizing Orthogonal Frequency Division Multiplexing (OFDM) modulation, the embodiments of present invention are not limited thereto and, for example, can be implemented for other wireless networks and using other modulation schemes where suitably applicable.

The following inventive embodiments may be used in a variety of applications including transmitters and receivers of a radio system, although the present invention is not limited in this respect. Radio systems specifically included within the scope of the present invention include, but are not limited to: wireless local area network (WLAN) devices, wireless personal area network (WPAN) devices and wireless wide area network (WWAN) devices including network interface devices and peripherals such as network interface cards (NICs), base stations, access points (APs), gateways, bridges, hubs and network portals. Further, the radio systems within the scope of the invention may include cellular radiotelephone systems, satellite systems, personal communication systems (PCS), two-way radio systems, one-way pages, two-way pagers, personal computers (PC), personal digital assistants (PDA), personal computing accessories (PCA) and all existing and/or future arising systems which may be related in nature and two which the principles of the invention could be suitably applied.

Figure 1:
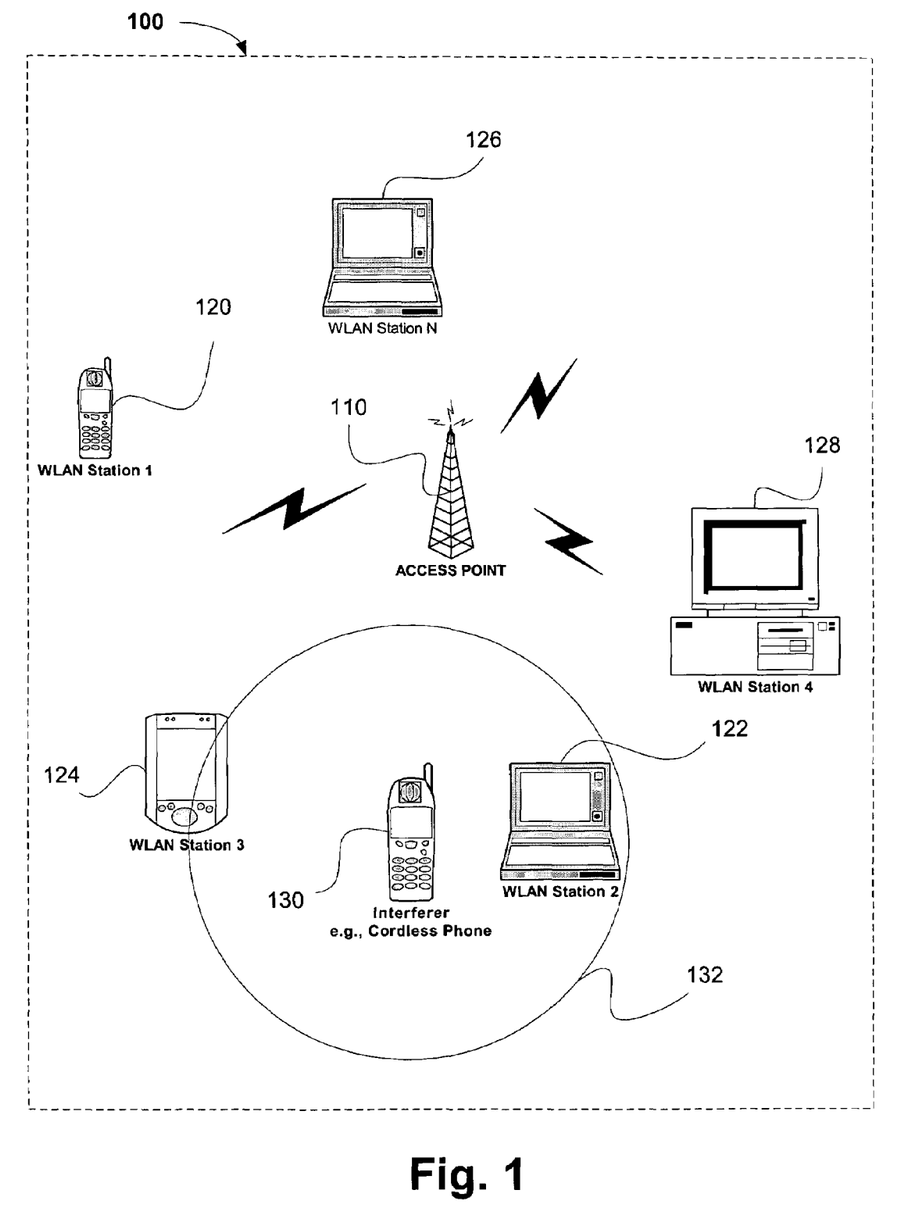
FIG. 1 is a functional diagram of an exemplary wireless network according to one embodiment of the present invention.

Turning to FIG. 1, an example wireless network 100, to which embodiments of the present invention may be applied, may include one or more wireless network access stations 110 and one or more wireless user stations 120, 122, 124, 126 and 128. User stations 120, 122, 124, 126 and 128 communicate with network access station 110 via various wireless links.

User stations 120, 122, 124, 126 and 128 may be any device or combination of devices capable of transmitting and/or receiving radio information to/from network access station 110. Such devices may include but are not limited to personal computers (PCs) (e.g., desktop PC 128 and/or laptop computers 122, 126), hand held computing devices (e.g., personal digital assistant (PDA) 124) and personal communication devices (e.g., WLAN enabled cell phone 120) or components utilized in conjunction with any of the foregoing devices for wireless communications such as network interface cards (NICs), wireless routers and the like.

Network access station 110 serves to facilitate a wireless link with one or more user stations including, potentially, facilitating wireless communications between user stations 120, 122, 124, 126 and 128 and one or more devices coupled to network access station 110 via a wired network (not shown). Network access station 110 may be any single device or combination of devices suitable for this purpose. In one embodiment network station 110 may be an access point (AP) in a WLAN although the invention is not limited in this respect.

As briefly mentioned above, communications in a wireless network, for example between network access station 110 and user stations 120-126, may be degraded by other non-network devices such as cordless phone 130 which uses similar channel resources. Interference from device 130 and/or its location within network 100 may typically be difficult to detect since degradation in communications between network access station 110 and user stations 120-128 are often due to other problems such as scattering, obstacles, and/or multipath reflections.

According to one embodiment of the present invention, a wireless communication system using Orthogonal Frequency Division Multiplexing (OFDM) and Adaptive Bit Loading (ABL) can be adapted to intelligently detect non-network interfering devices (also referred to as "interferers"). OFDM works by dividing up a wideband channel into a larger number of sub-channels. By placing a subcarrier in each sub-channel, each subcarrier may be modulated separately depending on the signal to noise (SNR) characteristics in that particular narrow portion of the band. As the channel varies over time, further adaptations can be made on each subcarrier in order to continually optimize the data-carrying capacity of the channel. This technique is generally referred to herein as "adaptive modulation."

In wireless networks using adaptive modulation techniques, such as OFDM with ABL, it is expected that initial information may be exchanged between two communicating terminals in order to facilitate accurate modulation adaptation. Considering only signal propagation the channel should be symmetric in both the uplink and downlink directions between the two communicating terminals. However, interference from a non-network device may destroy the symmetry of the adaptive modulation between the two terminals. Accordingly, an access point (AP) or other network device could be adapted to roughly determine the location of a rogue interferer by examining the differences in modulation adaptations between its downlink streams and the modulation adaptations requested by terminals for uplink streams. A partial-band interferer will cause the largest difference in downlink/uplink modulation adaptations for stations to which it is nearest. Accordingly, knowledge of the rough locations of the stations experiencing interference can substantially narrow down the search area for the interfering device by comparing the adaptation differences in the frequency region of interest for affected and unaffected stations.

In one example scenario for a wireless communication system utilizing OFDM with ABL, an initial handshake communication may be used for determining what modulation order (i.e., the number of bits per OFDM symbol, for example, binary phase shift keying (BPSK), quadrature phase shift keying (QPSK), etc.) should be used for modulating each subcarrier in a modulated data signal between terminals. For example, referring to FIG. 1, user station 122 may send a communication (for example, a request to send (RTS) message) to network access station 110 indicating that station 122 wishes to send a data message to network station 110.

When network access station 110 is available, it may then indicate so in a communication to user station 122, for example using a clear to send (CTS) message. This indicates that it is now acceptable to send the data message. In this scenario, network station 110 may estimate one or more frequency dependent channel characteristics, for example, the gain plus optionally phase or attenuation of each subcarrier in the initial communication from user station 122 in order to determine an appropriate modulation adaptation for modulating each subcarrier of the data message to be sent from user station 122.

The modulation adaptation may specify, among other things, the particular modulation order to be used for modulating each subcarrier in the data message. Network station 110 then sends a modulation order request to user station 122, for example, as part of the CTS message, specifying how user station 122 should modulate the subcarrier of the data message. The reciprocal of this process may be performed for data messages sent from network station 110 to user station 122 or for any communications between devices in network 100. In this manner, communications between respective terminals can be adaptively modulated to suit the conditions of the channel.

Figure 2:
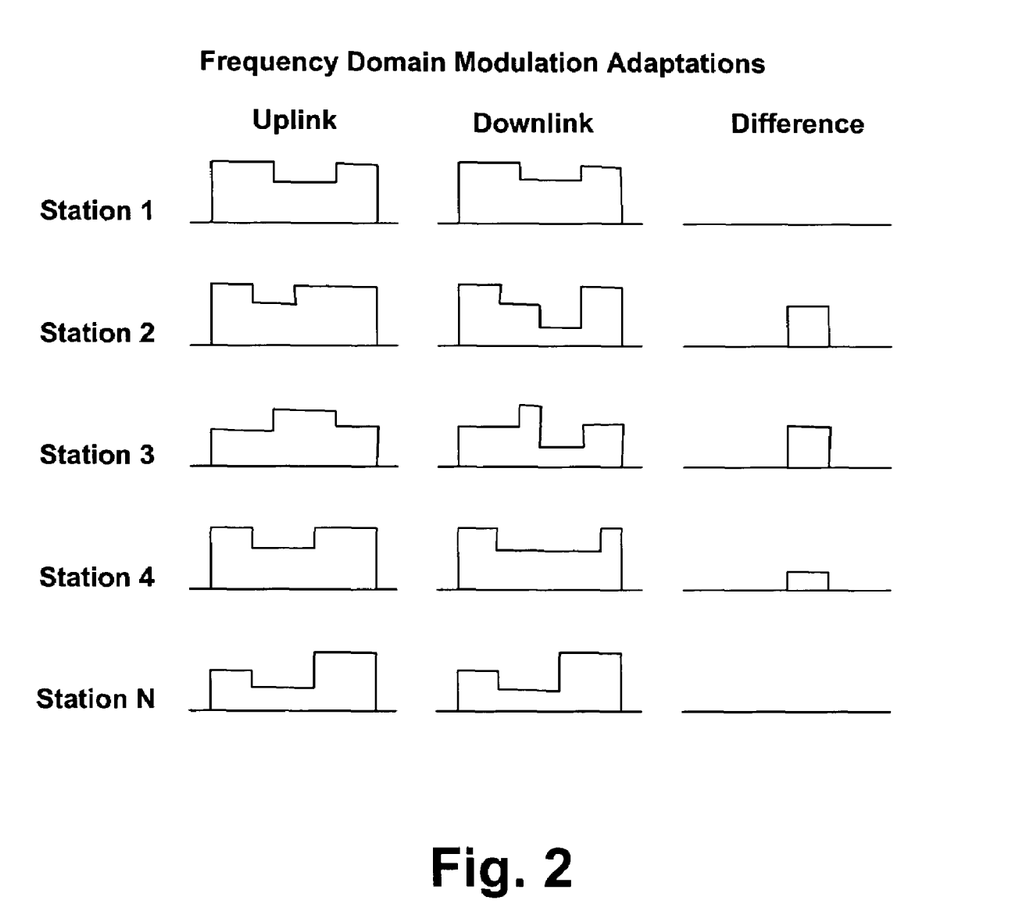
FIG. 2 is an example diagram of uplink/downlink modulation adaptations for various communication devices in the exemplary wireless network shown in FIG. 1.

Referring to FIG. 2, sample frequency domain modulation adaptations are shown for various links in wireless network 100 (FIG. 1) for both the uplink and downlink directions. Since the signal propagation is symmetric and radio effects are generally small, any significant difference in modulation adaptations (due to per-subcarrier signal to interference plus noise ratio (SINR)) will most likely be due to interference.

Sample modulation order requests for the various user stations 1-N (representing user stations 120-128 in the example of FIG. 1) are shown in both the uplink direction (i.e., to the network access station) and the downlink direction (i.e., from the network access station). In a short time frame, the frequency characteristics of a communication channel between two terminals that are not experiencing any significant interference should remain relatively equal (or symmetric) in both the uplink direction and downlink direction. This is shown in FIG. 2 by the example modulation order requests for station 1 (e.g., user station 120 (FIG. 1)) which are very similar in the uplink direction as in the downlink direction. Since stations 1 and N are reasonable distances from the low-powered interferer (i.e., cordless phone 130), their links are symmetric in both uplink and downlink directions.

However, referring back to FIG. 1, since user stations 122 (station 2) and 124 (station 3) are nearest to interferer 130, their ABL differences in uplink and downlink directions are the largest since downlink transmissions may be corrupted by interferer 130.

Consequently, as seen in FIG. 2, the modulation orders for communications in the uplink and downlink directions for stations 2 and 3 may be significantly different. Therefore, if the modulation adaptations for the communications in the uplink and downlink directions are compared and a significant difference is identified, the possible existence of an interferer device can be presumed.

When a threshold magnitude of difference between modulation adaptations in the uplink and downlink direction is exceeded, a network administrator (or other person or device) may be alerted of at least the possibility that an interferer is present within the wireless network. Preferably, the proximate location of the interferer may be determined if the location of any wireless device experiencing the interference (e.g., Station 2) is known or can be determined.

Detection of the interferer can further be improved, and/or its more precise location may be better estimated, when two or more network devices (e.g., user stations 124 (station 3), 128 (station 4); FIGS. 1 and 2) are identified to have differences between uplink and downlink adaptive modulation requests. The magnitude of differences in uplink/downlink modulation adaptations for each station can be compared to determine which station has the greatest difference and thus is in the closest proximity to the interferer.

Furthermore, while generally, the location of every user station in a wireless network may not be known, it is increasingly likely that the location of at least one of the stations will be known (or can be determined) when multiple stations are experiencing interference. In the example scenario of FIG. 2, stations 2-4 can be seen to be experiencing some difference in uplink/downlink modulation adaptations, with stations 2 and 3 experiencing the greatest magnitude of difference. Accordingly, the interferer causing the differences would most likely be in a position in closest proximity to stations 2 and 3 and within some general proximity to station 4. If the location of stations 2-4 is known, the location of the interferer can be determined with reasonable accuracy. However, if the location of only one of stations 2-4 is known (or can be determined), the interferer may be tracked only to some general proximity to the known station. The invention can be further improved by observing the changes in adaptive modulation for a mobile station as it moves if its motion can be tracked. For example, a mobile device (e.g., PDA or a wandering laptop) can also provide interferer proximity information if the location of the PDA/laptop is known or can be determined (e.g., tracked as it moves). This capability requires some location/tracking mechanism to be employed which can determine the location of mobile devices, which may or may not be present in future systems.

Figure 3:
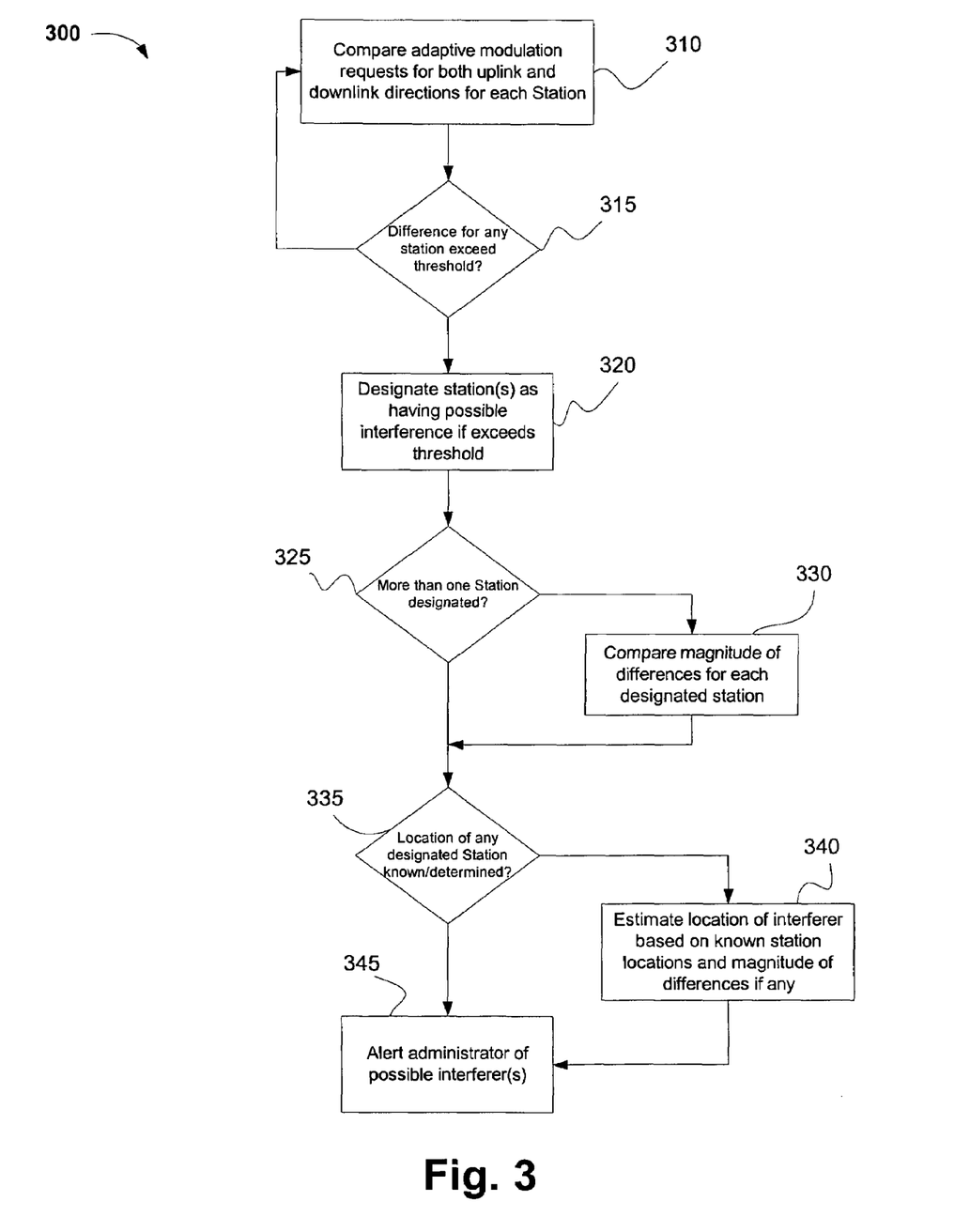
FIG. 3 is a flow chart of a method of detecting an interferer in a wireless network according to one embodiment of the present invention.

Turning to FIG. 3, a method 300 for detecting interferers in a wireless network according to one embodiment of the present invention generally includes comparing 310 adaptive modulation information in wireless communications to identify differences in uplink and downlink directions and determining 315 whether the identified differences (if any) exceed a threshold value. An alert signal may optionally be generated 345 if one or more of the identified differences exceed the threshold value.

In one preferred implementation, method 300 may further include designating 320 each station as having an interferer in its proximity if a magnitude of difference between modulation adaptations in the uplink/downlink directions exceeds the threshold. Additionally, if it is determined 325 that more than one station exceeds the threshold, the magnitude of differences in the modulation adaptations for each station may be compared 330 with one another for assisting in estimating 340 the location of the interferer when one or more of the station locations are known or determined 335.

In one embodiment using Adaptive Bit Loading and constant transmit power for all active subcarrier, only the differences in modulation orders in the uplink/downlink directions are used to detect for potential interfering devices. However, other modulation parameters or information, such as power loading allocations and the like, could alternatively or additionally be compared in uplink and downlink directions to determine whether an interferer may be present near a communicating wireless terminal.

The threshold for determining 315 whether the station is potentially encountering interference from a non-network device is discretionary and may be set to discount other types of noise or conditions which may affect channel conditions. Further, the threshold may be set such that acceptable levels of interference do not trigger an alarm if desired. Additionally, since one-time events, such as a moving non-network wireless device may affect channel conditions only for a brief time, the threshold could be selected and/or compared against, for example, an average of differences between uplink/downlink adaptive modulation information between the same stations.

The location of some stations in a wireless network may be known and/or stored and used for estimating 340 the location of an interferer. It is also possible that the location of a station is not known but can be determined using well known techniques for locating a source of a wireless broadcast such evaluation of signal strength, signal phases or triangulation techniques. Triangulation of station signals may be increasingly possible as more and more wireless stations begin using multiple transmit antennas.

If the location of one or more stations designated 320 as having possible interference is known or can be determined, then at least a vague proximity of the interferer with respect to the known location of the station can be estimated 340. The precision of estimating the location of an interferer may significantly depend on the number and/or accuracy of known locations for the terminals in the wireless network. Numerous possible modifications of the sequences, features and specific implementations of method 300 are apparent to the skilled artisan and the embodiments of the invention are thus not limited to those specifically shown and described in reference to FIG. 3.

Figure 4:
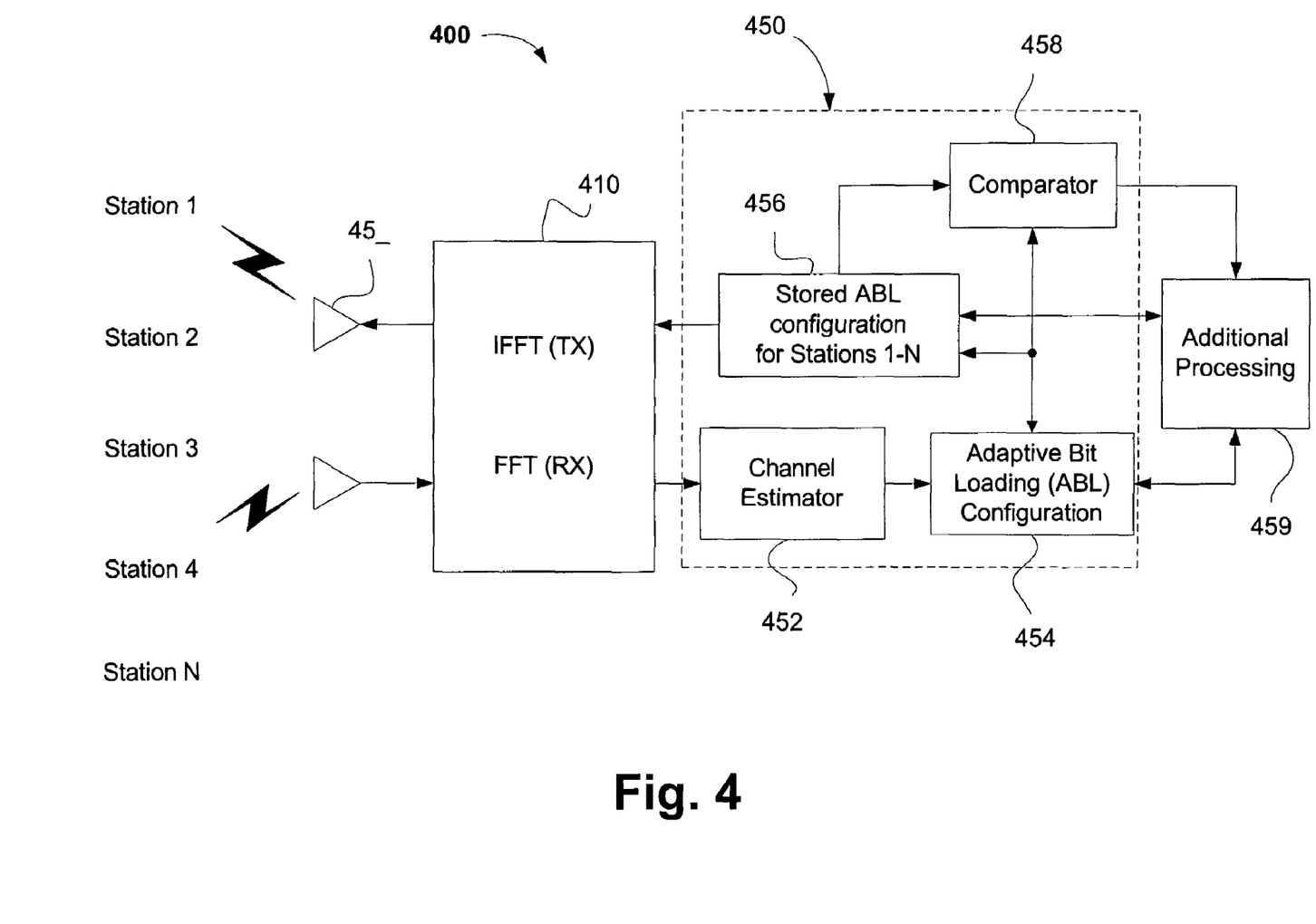
FIG. 4 is a block diagram of an interference detecting communication device using adaptive modulation according to one embodiment of the present invention.

FIG. 4 shows an example block diagram of an apparatus 400 enabled to detect interferers in a wireless network according to one embodiment of the invention. Apparatus 400 may be implemented as part of a device such as a transceiver or modulator and may include one or more filters 410 for Fast Fourier Transform (FFT) and/or Inverse FFT conversion and one or more antennas 420 for transmitting and/or receiving signals. The embodiments of the present invention however are primarily implemented using the adaptive modulation components 450 in apparatus 400. In one embodiment, the adaptive modulation components 450 include a channel estimator 452, an Adaptive Bit Loading (ABL) processing portion 454, one or more memories 456 coupled to ABL processing portion 454, and a comparator 458.

Channel estimator 452 functions to measure one or more frequency dependent channel characteristics of incoming signals (e.g., from user stations 1-N; FIG. 2). The particular channel characteristics measured by estimator 452 may vary and/or be selected based on the type of adaptive modulation technique desired. In one example, estimator 442 is configured to measure the gain, and optionally the phase or attenuation, of the subcarrier in a received signal.

The measured frequency dependent channel characteristics may then be used by ABL processing portion 454 to determine appropriate adaptive modulation information (e.g., modulation orders) to be used by the sending station (not shown). The adaptive modulation information may be stored in memory 456 for use in generating a modulation adaptation request and/or for comparison by comparator 458 with previously used adaptive modulation information, including for example, modulation orders requested by the transmitting station. Comparator 458 outputs the difference, if any, between adaptive modulation information for uplink and downlink communications for each station with which it communicates (e.g., Stations 1-N). This output may be utilized by processing portion 459 to compare with a threshold value, generate a potential interferer alert and/or estimate a geographic location of the interferer.

The components and features of apparatus 400 may be implemented using any combination of discreet circuitry, application specific integrated circuits, logic and/or single chip architecture. Further, the features of apparatus 400 may be implemented using microcontrollers, programmable logic arrays and/or microprocessors or any combination of the foregoing where suitably appropriate.

It should be appreciated that the example apparatus shown in block diagram of FIG. 4 is only a functionally descriptive example of many potential implementations and that division, omission or inclusion of block functions in FIG. 4 does not infer that the hardware components, circuits and/or elements for implementing these functions would be divided, omitted, or included in embodiments of the present invention.

Figure 5:
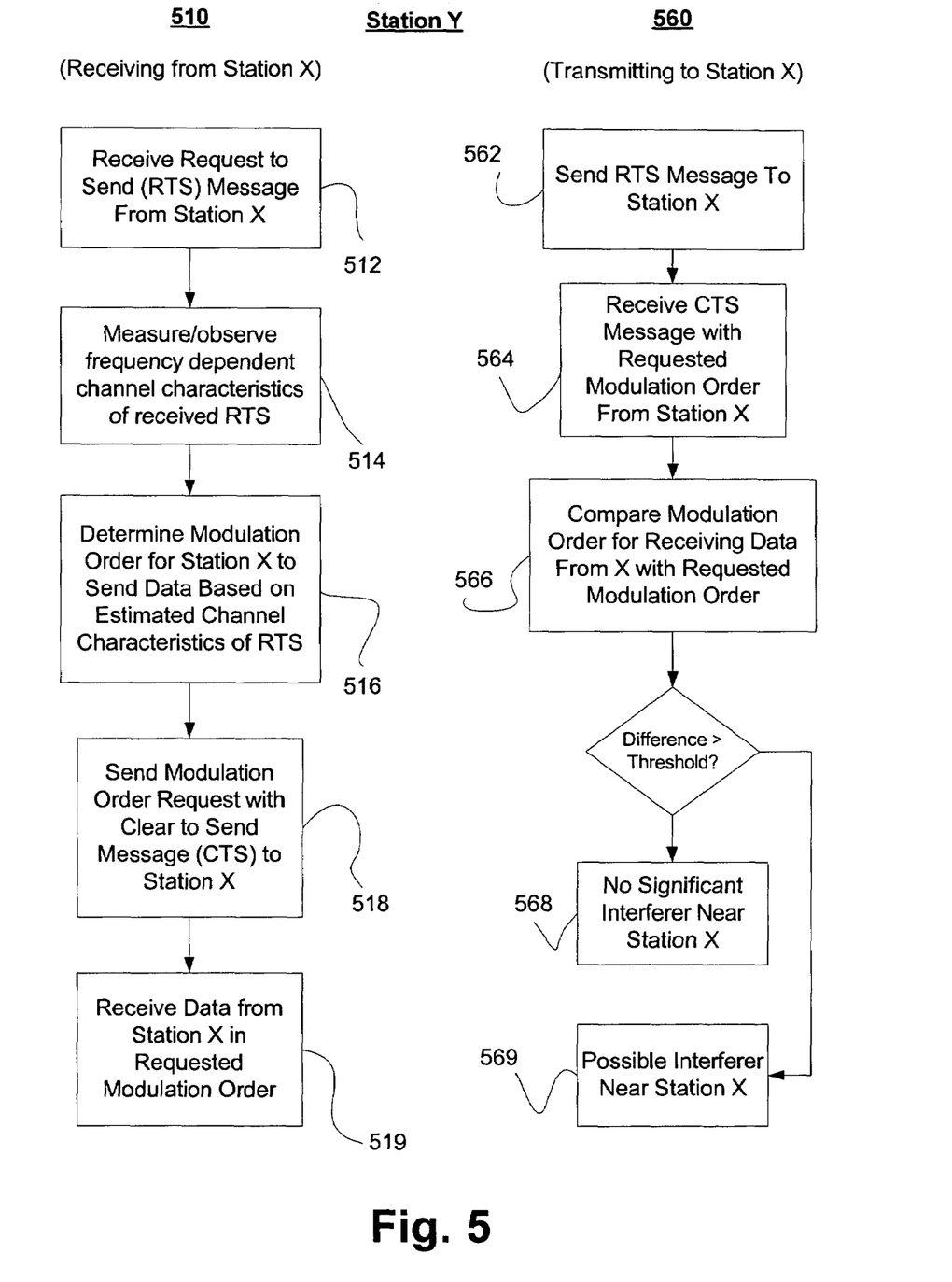
FIG. 5 is a flow chart illustrating respective transmit and receive sequences in a communication device according to various aspects of the present invention.

Turning to FIG. 5, exemplary receive and transmit sequences 510, 560 are shown for a communication device configured to detect interferers in a wireless network according to one embodiment of the invention. In this example, a device (i.e., station Y, which may be similar to the device shown in FIG. 4) is enabled to detect interferers during communication with another station (i.e., station X). In the receiving sequence 510, which may either be the uplink or downlink direction depending on whether station Y is a network access station or a user station, station Y may receive 512 a request to send (RTS) message from station X indicating that station X wishes to send data to station Y. Station Y measures 514 one or more the frequency dependent channel characteristics of the subcarrier in the received RTS message and determines 516 a modulation order to be used by station X to send data. A modulation order request may then be sent 518 by station Y to station X as part of a clear to send (CTS) message. Station X will then modulate the data message to be sent to station Y according to the modulation orders requested by station Y. Station Y receives 519 the data message from station X which is modulated according to the request previously sent by station Y. Station Y is then able to receive and process the OFDM symbols in the signal from station X as station Y knows in advance how the signal is modulated. This closed loop adaptation mechanism provides fast link adaptation that can follow time-varying channel characteristics.

In the transmit sequence 560 to station X, the converse procedure may be performed where station Y sends 562 an RTS message and receives 564 a CTS message from station X including modulation orders for modulating the transmission. At this point, station Y can compare 566 modulation orders requested by station X (known from the just received CTS message) with the modulation orders station Y previously requested of station X (previously stored) to see if there is any significant difference in modulation adaptations for the uplink and downlink directions. If no or little difference between uplink and downlink modulation adaptations exists, it is determined 568 that no interferer exists near station X. If a difference does exist and the difference is greater than a threshold value, then station X is determined 569 to have a possible interferer nearby. In this manner, an individual station such as an access point or other network access node, can determine which stations in its communication range may be experiencing interference from a non-network device.

The inventor contemplates that the embodiments of the present invention may be integrated as part of a fixed network, for example as an interferer detection mechanism used in conjunction with network management software to manage/oversee multiple network access nodes; or as a detection mechanism for individual access nodes in a wireless network. Alternatively or additionally, the embodiments of the present invention may be implemented as a hand held device specifically used for detecting and/or locating interferers in a wireless network.

Unless contrary to physical possibility, the inventors envision the methods described herein: (i) may be performed in any sequence and/or in any combination; and (ii) the components of respective embodiments combined in any manner.

Although there have been described preferred embodiments of this novel invention, many variations and modifications are possible without departing from the scope of the invention and the embodiments described herein are not limited by the specific disclosure above, but rather should be limited only by the scope of the appended claims and their legal equivalents.

The invention claimed is:

1. A method of detecting an interfering device in a wireless network, the method comprising:
comparing adaptive modulation information for a communication channel between at least two terminals in both an uplink direction and a downlink direction to determine if a difference adaptive modulation exists; and
if the difference exists determining that a potential interferer is present in the wireless network.

2. The method of claim 1 wherein the communication channel utilizes orthogonal frequency division multiplexing (OFDM) and adaptive bit loading (ABL).

3. The method of claim 2 wherein the adaptive modulation information comprises modulation orders in the uplink direction and modulation orders in the downlink direction.

4. The method of claim 1 wherein the adaptive modulation information comprises adaptive power loading in the uplink direction and adaptive power loading in the downlink direction 5. The method of claim 1 further comprising determining the potential interferer to be located in a geographic region proximate to one or more network devices having a greatest magnitude of differences between uplink and downlink adaptive modulation information.

6. The method of claim 2 wherein one of the at least two terminals comprises an access point (AP) and wherein the wireless network comprises a wireless local area network (WLAN).

7. An apparatus for detecting an interfering device in a wireless network, the apparatus comprising:
an adaptive modulation component operative to adaptively modulate a signal according to a received requested modulation order;
a comparator communicating with the modulation component and adapted to identify a difference between adaptive modulation information in an uplink direction and adaptive modulation information in a downlink direction; and
if the difference exists determining that a potential interferer is present in the wireless network.

8. The apparatus of claim 7 further comprising a locator component configured to estimate a location of the interfering device relative to other network devices in the wireless network based on identified differences in adaptive modulation information in uplink and downlink directions for network devices communicating with the apparatus.

9. The apparatus of claim 7 wherein the apparatus comprises a wireless local area network (WLAN) access point (AP).

10. The apparatus of claim 7 wherein the adaptive modulation component uses orthogonal frequency division multiplexing (OFDM) and adaptive bit loading (ABL).

11. The apparatus of claim 7 wherein the apparatus comprises a hand held mobile unit.

12. A system for detecting an interfering device in a wireless network, the system comprising:
a transceiver operative to send and receive communications in multi-carrier signals including a plurality of modulated subcarriers;
a comparator unit coupled with the transceiver and configured to compare modulation orders for subcarriers in an uplink direction and a downlink direction and identify, if any, a difference between the modulation orders for the uplink direction and the modulation orders for the down link direction; and
if the difference exists determining that a potential interferer is present in the wireless network.

13. The system of claim 12 further comprising an omni-directional antenna coupled to the transceiver and operative to broadcast and receive the multi-carrier signals.

14. The system of claim 12 further comprising a locator unit configured to identify an approximate location of the interfering device relative to other network devices in the wireless network based on differences in modulation orders in uplink and downlink directions for all network devices communicating with the transceiver.

15. The system of claim 12 wherein the multi-carrier signals are modulated using OFDM.

16. The system of claim 12 wherein the system comprises a WLAN AP.

17. A method of detecting an interfering device in a wireless network, the method comprising:
   comparing adaptive modulation information for subcarriers between an uplink direction and a downlink direction to determine if a difference adaptive modulation exists; and
   identifying that a device is interfering if the difference exceeds a threshold value.

18. The method of claim 17 further comprising determining a location of the device proximate to a network device having a greatest magnitude of difference between uplink and downlink adaptive modulation information.

19. The method of claim 18 wherein comparing modulation orders and identifying that the device is interfering are performed at an access point.

20. The method of claim 19 wherein determining the location of the device is performed at a centralized location separate from the access point.

21. The method of claim 17 wherein the subcarrier are modulated as an OFDM signal.

22. The method of claim 17 wherein the wireless network comprises a WLAN.

23. A method of detecting an interfering device in a wireless network, the method comprising:
   estimating one or more frequency dependent channel characteristics in a communication channel using modulated subcarriers for communicating between a first network device and a second network device;
   determining a modulation order per subcarrier based on the estimated frequency dependent channel characteristics;
   comparing modulation orders for communicating in both an uplink direction and a downlink direction between the first and second network devices to identify a difference; and
   if the difference exists determining that a potential interferer is present in the wireless network.

24. The method of claim 23 wherein the communication channel utilizes orthogonal frequency division multiplexing (OFDM) and adaptive bit loading (ABL).

25. The method of claim 23 further comprising comparing adaptive power loading per subcarrier in the uplink direction and adaptive power loading per subcarrier in the downlink direction to identify a power loading difference.

26. The method of claim 23 further comprising estimating a location of a potential interferer to be located in a geographic region proximate to one or more network devices having a greatest magnitude of difference between uplink and downlink modulation orders.

27. An apparatus for detecting an interfering device in a wireless network, the apparatus comprising:
   a channel estimator configured to estimate one or more channel characteristics of a communication channel with a network device;
   a modulation adaptor communicating with the channel estimator and configured to determine a modulation order for the network device to modulate subcarriers based on the estimated frequency dependent channel characteristics;
   a comparator communicating with the modulation adaptor and configured to compare modulation orders of subcarriers in an uplink direction with modulation orders of subcarriers in a downlink direction with the network device and identify, if any, a difference between the modulation orders for the uplink direction and the modulation orders for the downlink direction; and
   if the difference exists determining that a potential interferer is present in the wireless network.

28. The apparatus of claim 27 wherein the apparatus comprises a wireless local area network (WLAN) access point (AP).

29. The method of claim 27 wherein the modulation adapter uses orthogonal frequency division multiplexing (OFDM) and adaptive bit loading (ABL).

30. The apparatus of claim 27 wherein the apparatus comprises a hand held mobile unit.

* * * * *